United States Patent [19]

Nyfeler et al.

[11] 4,223,050
[45] Sep. 16, 1980

[54] PROCESS FOR EMBOSSING A RELIEF PATTERN INTO A THERMOPLASTIC INFORMATION CARRIER

[75] Inventors: Alex Nyfeler, Barr; David L. Greenaway, Oberwil, both of Switzerland

[73] Assignee: LGZ Landis & Gyr Zug AG, Zug, Switzerland

[21] Appl. No.: 948,239

[22] Filed: Oct. 3, 1978

Related U.S. Application Data

[63] Continuation of Ser. No. 775,775, Mar. 9, 1977, abandoned.

[30] Foreign Application Priority Data

May 4, 1976 [CH] Switzerland ............... 5549/76

[51] Int. Cl.² .................. B29C 17/00; B29D 11/00
[52] U.S. Cl. ........................... 427/163; 264/1; 264/2; 264/25; 264/293; 427/162; 427/276
[58] Field of Search ............... 264/1, 2, 25, 284, 293, 264/134; 427/162, 163, 276, 277

[56] References Cited

U.S. PATENT DOCUMENTS

| | | | |
|---|---|---|---|
| 2,541,214 | 2/1951 | Davis | 101/31 |
| 3,497,576 | 2/1970 | Dvorin | 264/320 |
| 3,882,207 | 5/1975 | Hannan | 264/1 |

FOREIGN PATENT DOCUMENTS 359018 10/1931 United Kingdom ............... 264/293

*Primary Examiner*—James B. Lowe

[57] ABSTRACT

There is disclosed a method for embossing a relief pattern of high resolution into a thermoplastic information carrier by means of a heatable embossing matrix. The matrix, which exhibits the desired relief pattern, is pressed onto the thermoplastic information carrier, and is then heated by means of an electric current. After the electric current has ceased, the embossing pressure is maintained until the thermoplastic information carrier has hardened through cooling. Alternative methods permits selected variation of the relief pattern to be embossed by selectively altering the surface of the support member which supports the information carrier during the embossing operation or by selectively heating the embossing matrix.

9 Claims, 8 Drawing Figures

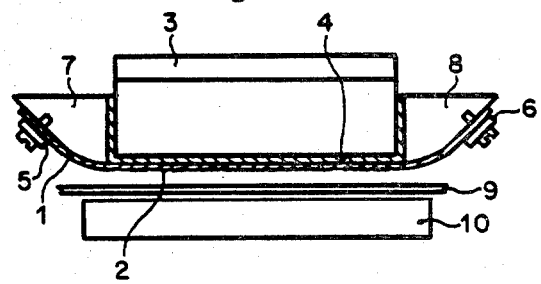
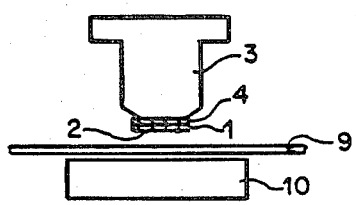
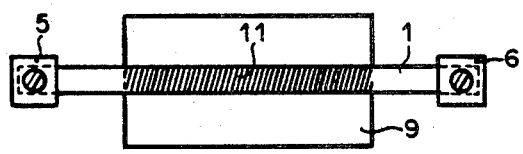
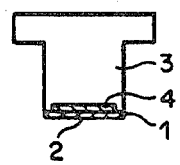
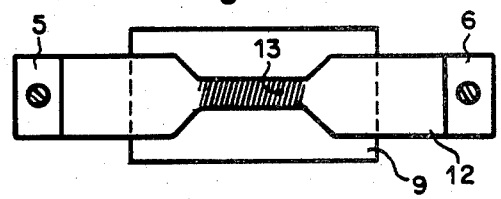
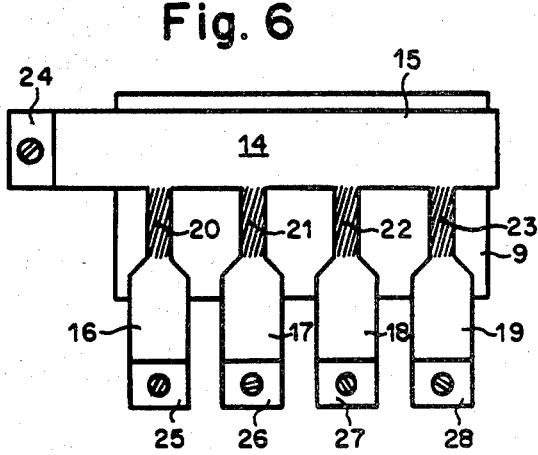
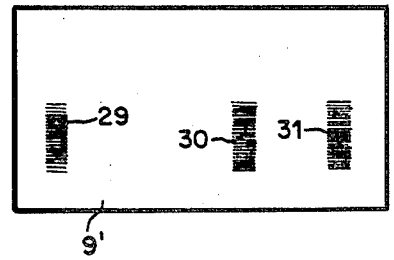

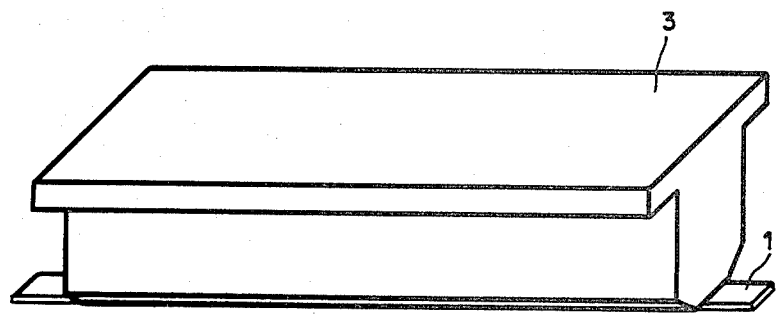
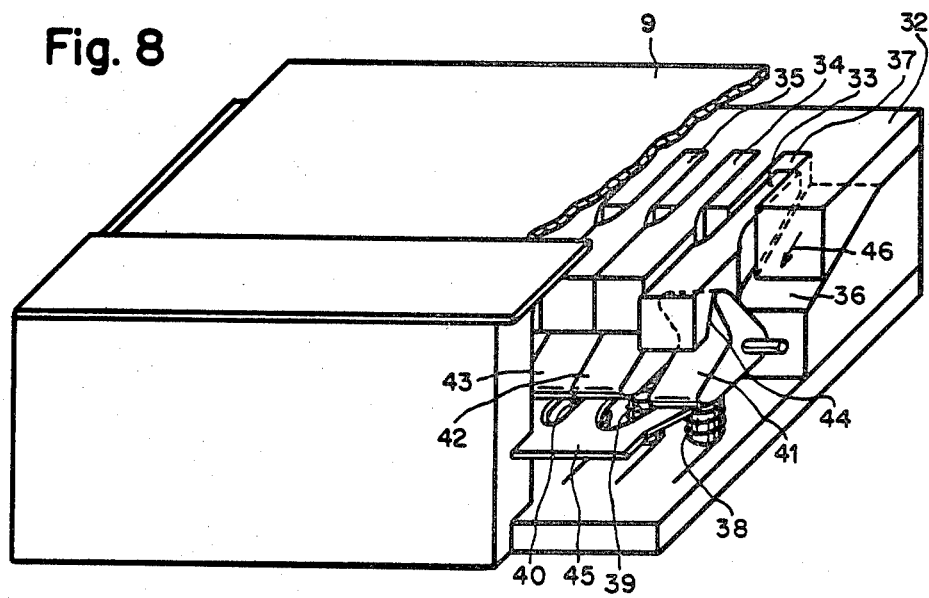
Fig. 8

PROCESS FOR EMBOSSING A RELIEF PATTERN INTO A THERMOPLASTIC INFORMATION CARRIER

This is a continuation, of application Ser. No. 775,775 filed Mar. 9, 1977 now abandoned.

BACKGROUND AND BRIEF DESCRIPTION OF THE INVENTION

The invention relates to a method for the embossing of at least one relief pattern of high resolution, particularly a phase hologram or a phase diffraction grating, into a thermoplastic information carrier, by means of a heatable embossing matrix in the form of a foil, which carries the relief pattern.

Storage of information in the form of relief patterns of high resolution, such as phase holograms, phase diffraction gratings and the like, is well known. In such a process, the relief pattern is embossed by means of pressure and heat into the thermoplastic carrier which, depending on its end purpose, may be in the form of a card, a band, a foil or a disk. The embossed relief patterns which, for example, contain video-information or validity information, can be read mechanically by means of optical devices.

In a well-known method for embossing phase holograms, a thermoplastic film and an embossing matrix in the form of an endless band which carries the hologram relief pattern, are jointly passed between two calender rollers. During its passage between the calendar rollers, one of which is heated, the thermoplastic film is heated to a suitable temperature and is subsequently separated from the hologram matrix. This method permits a relatively high speed of passage, but requires significant investment and is therefore not economical when only a limited number of copies of a specific relief pattern are to be embossed, or when the relief pattern must constantly be changed. Moreover, this method does not permit the embossing of high-quality relief patterns of high resolution into a thermoplastic material when the surface of the latter is coated with a metallic layer.

The object of the invention is to propose a method of the kind mentioned at the outset, which would permit economical embossing of limited quantities of relief patterns with a high resolution, into either uncoated or metallic-coated thermoplastic material.

The invention consists in pressing the embossing matrix onto the thermoplastic carrier by means of a punch, while the embossing matrix is heated by a current running through it, and then maintaining the embossing pressure acting on the information carrier until the embossed relief pattern has hardened.

An embossing device to perform the method comprises an embossing matrix consisting of at least one band-shaped electric conductor connected to a source of current impulses and fastened to a punch.

BRIEF DESCRIPTION OF THE DRAWINGS

A certain number of embodiments of the invention will be further explained below on the basis of the drawings:

FIG. 1 shows an embossing arrangement;
FIG. 2 shows an embossing arrangement as in FIG. 1 but in a lateral view;
FIG. 3 shows a punch;
FIGS. 4 to 6 show parts of embossing arrangements in top view;
FIG. 7 shows an embossed information carrier, and
FIG. 8 shows another embossing arrangement.

DETAILED DESCRIPTION OF THE INVENTION

In FIG. 1, an embossing matrix 1 consists of a band-shaped electric conductor, and exhibits a relief pattern 2 on one surface. This relief pattern is preferably formed by one or more phase holograms or phase diffraction gratings, in which the linear distance of the grating may be in the order of magnitude of a few microns. Methods to manufacture embossing matrixes of metal with relief patterns of this kind are well known, and therefore require no further explanation; for example, a copy of an original hologram, serving as embossing matrix 1, can be manufactured of nickel through chemical or galvanic coating.

The embossing matrix 1 is fastened to a punch 3. In the example shown an intermediate layer 4 of insulating material lies between the punch 3 and the embossing matrix 1; this allows the punch 3 to be made of metal. Two opposite extremities of the embossing matrix 1 are clamped between the electric contact pieces 5, 6 and the tightening blocks 7, 8. The tightening blocks 7, 8 are fastened to two lateral faces of the punch 3 and are electrically insulated from the latter. A source of current impulses (not shown) is connected to the contact pieces 5, 6.

The thickness of the embossing matrix 1 preferably lies within the range of 0.02 mm to 0.15 mm. Its length and width are conditioned upon the dimensions of the relief pattern 2 and the clearance needed for the clamping. To mold the relief pattern 2 on a thermoplastic information carrier 9, the latter is placed on a rigid support 10, and the embossing matrix 1 is pressed on the information carrier by means of the punch 3. By means of a current impulse flowing through the embossing matrix 1, the matrix is briefly heated. Because of the intimate contact between the embossing matrix 1 and the information carrier 9, the heat flows quickly to the information carrier, heating its surface to the temperature at which the thermoplastic material will be plasticized and will adopt the desired relief structure. After the current impulse is ended, the embossing matrix 1 and the information carrier 9 will cool off quickly with the heat flowing into the support 10 and the punch 3. The embossing pressure acting on the information carrier 9 is maintained until the embossed surface is cooled to a temperature which is lower than the flow temperature of the thermoplastic material, thus hardening the embossed relief pattern. The information carrier 9 can then be separated from the embossing matrix 1.

By way of example, the following table shows typical conditions under which, by means of the described method, relief patterns with a very high resolution and quality were embossed.

| | |
|---|---|
| Material of the embossing matrix | Nickel |
| Thickness of the embossing matrix | 0.07 mm |
| Material of the information carrier | Hard-PVC |
| Embossing pressure | 20 kg/cm$^2$ |
| Heating energy/Embossing area | 10 J/cm$^2$ |
| Heating time | 0.2 s |
| Cooling time | 0.3 s |

The above values should be considered as mere guiding values. The individual parameters are strongly interdependent, and substantial deviations from the stated values may very easily occur. For example, increased embossing pressure will require less heating energy, whereas the selection of a thicker embossing matrix implies a longer cooling time. The embossing conditions selected in any specific case are considered to be optimal when, on the one hand, a true image of the relief pattern 2, and, on the other hand, a minimal deformation of the information carrier 9 in the areas outside the embossed relief pattern, are obtained.

The described method can be performed by very simple means and therefore allows an economical embossing of limited quantities. Because of the very low thermal capacity of the embossing matrix 1, and by means of the direct heating of same by a current impulse, the embossing operation on the one hand can be performed with a minimal consumption of energy, resulting on the other hand in a very short cooling time for the embossing matrix and the information carrier 9; the embossing pressure has only to be maintained for a short while before obtaining the hardening of the relief pattern, thus ensuring extremely well-formed relief patterns.

It was found that the method is also suited for the embossing of thermoplstic information carriers which are coated with a thin layer of non-thermoplastic material, in which the relief pattern is pressed on the information carrier through the said layer. For example, it is possible to emboss relief patterns with a very high resolution, true to form, into thermoplastic material the surface of which has been coated with a metallic layer.

The intermediate layer 4 arranged between the embossing matrix 1 and the punch 3 consists preferably of elastic material, for example, hard rubber, which will equilibriate roughnesses, if any, of the information carrier 9 to be embossed, or deviations from the parallelism between the surface of the information carrier and that of the embossing matrix.

When the embossing matrix 1 does not completely cover the surface of the information carrier 9, it sometimes happens that, during the embossing operation, thermoplastic material of the information carrier is displaced along the edges of the embossing matrix, thus creating small burrs which in specific cases may be a disturbing factor. However, this can be avoided in a simple manner—as can be seen from FIG. 2—when the edges of the punch 3 are beveled or rounded and the embossing matrix 1, as well as the elastic intermediate layer 4, overlap the abutting surface of the punch.

A further possibility to avoid embossing burrs is shown in FIG. 3. The elastic intermediate layer 4 is arranged in a recess of the punch 3 which consists of material with good heat conductivity. The edges of the embossing matrix 1 rest on the punch 3, so that during the embossing operation they will reach a lower temperature than the inner area of the embossing matrix carrying the relief pattern. The punch 3 may, for example, consist of aluminum the surface of which exhibits a thin oxide coating, by which it is electrically insulated against the abutting edge of the embossing matrix 1.

FIG. 4 shows the information carrier 9, the band-shaped embossing matrix 1 lying thereon and the contact pieces 5, 6 in top view. The punch 3 (FIG. 1) and the support 10, in order to permit a better overview, are not shown in FIG. 4. The embossing matrix 1 exhibits a constant width, so that during the embossing operation it will be uniformly heated by the current impulse over its total embossing area 11 resting on the information carrier 9 (see the hatched area in the drawings).

FIG. 5 shows an embossing matrix 12 provided with a narrow pass or notch 13. Only the narrow pass 13 is heated by the current impulse to the temperature required for the embossing. The embossing area (again shown by shading in FIG. 5) corresponds to the surface of the narrow pass 13.

By designing a narrow pass 13 in the embossing matrix 12, it can be ensured that the relief pattern of the embossing matrix will only impress a selected embossing area into the information carrier 9, whereas any relief pattern of the embossing matrix situated outside the narrow pass will not be reproduced on the information carrier. Naturally, the embossing matrix may be provided with several of these narrow passes, electrically connected in series and/or in parallel.

The embossing matrix 14 represented in FIG. 6 consists of a band-shaped part 15 and several band-shaped parts 16 to 19 branching from the former, which exhibit narrow passes 20 to 23. Each one of the band-shaped parts 15 to 19 is electrically connected to a contact piece 24 to 28. Via a coding switch (not shown) sources of current impulses are connected to these contact pieces in such a manner that during the embossing operation one or more of the band-shaped parts 16 to 19 are selectively traversed by a current impulse. The relief patterns, which may, for example, represent a binary coded decimal number, are embossed into the information carrier 9 within the embossing areas supplied by the selected narrow passes 20 to 23.

FIG. 7 shows the information carrier 9' after completed embossing in the case where the band-shaped parts 20, 22 and 23 of the embossing foil 14 were traversed by the current. The relief patterns 29, 30 and 31, embossed into the information carrier 9' represent the binary numeral 1011, and can, for example, by means of an optical reading instrument be read mechanically in a serial or parallel operation. The embossed relief patterns 29 to 31 may be identical or different. The information carrier 9' preferably serves as a document, i.e. a credit card, identity card, travel ticket, security, and the like.

A further advantageous possibility to imprint only selectable areas of the relief pattern 2 on the information carrier 9, consists in using a base plate the surface of which facing the information carrier exhibits partial areas which can be adjusted in height. FIG. 8 shows an embossing arrangement with such a base plate, consisting of a rigid block 32 and movable sliders 33 to 35. These sliders lie in recesses 37 of the block 32, on a plane 36 which is inclined in relation to the surface of the block 32. Electromagnets 38 to 40 are coupled to one of the sliders 33 to 35 by means of a pivoting magnetic armature 41 to 43. The magnetic armatures 41 to 43, designed as angle levers, grip with one of their extremities into a conical groove 44 of the pertinent slider 33, 34 or 35. When the electromagnets 38 to 40 are not excited, a spring grating 45 presses the magnetic armatures 41 to 43 and the sliders 33 to 35 into the resting position, occupied on a common plane by the surface of the block 32 and the sliders 33 to 35.

When one or more of the electromagnets 38 to 40 are excited, the pertinent magnetic armature 41, 42 or 43 is pivoted against the force of the spring grating 45 and the slider 33, 34 or 35 coupled to the magnetic armature is moved on the inclined plane 36 in the direction of the arrow 46 and sinks under the surface of the block 32. During the embossing operation, the embossing pressure is transferred to areas of the information carrier 9 which lie on the block 32 or on one of the sliders 33, 34 or 35 which are in resting position. By this process, the areas of the information carrier 9 lying over a slider 33, 34 or 35 which is electromagnetically deflected from the resting position, will not be embossed, which allows the entering of code signs in the form of relief patterns into the information carrier.

A suitable selection of the gradient of the inclined plane 36 will ensure that, during the embossing operation, the non-actuated sliders 33, 34 or 35 cannot evade the embossing pressure and will through automatic locking remain in the resting position.

We claim:

1. A method for embossing a selected high-resolution diffraction phase relief pattern representing coded information into a thermoplastic information carrier, comprising:
   placing the thermoplastic information carrier on a support member;
   pressing a foil-shaped embossing matrix onto the thermoplastic information carrier, said embossing matrix having a diffraction phase relief pattern on the surface which is pressed onto the thermoplastic information carrier, and comprising a plurality of band-shaped branches each having a portion of said relief pattern contained thereon;
   selectively heating the embossing matrix by passing an electric current impulse through selected said branches of said matrix while it is pressed onto the thermoplastic information carrier, to cause the portions of the relief pattern contained on said branches to be embossed into the thermoplastic information carrier; and
   maintaining the embossing matrix pressed onto the thermoplastic information carrier after the electric current impulse has ceased, until the selected embossed relief pattern formed on the thermoplastic information carrier has hardened.

2. A method according to claim 1, wherein the thermoplastic information carrier has a coating of a thin metallic layer, and the selected relief pattern is embossed into the information carrier through said layer.

3. A method according to claim 1, wherein the selected relief pattern is a phase hologram or a phase diffraction grating.

4. A method for embossing a selected high-resolution diffraction phase relief pattern representing coded information into a thermoplastic information carrier, comprising:
   placing the thermoplastic information carrier on a support member, said support member comprising a base plate having an essentially planar surface facing the thermoplastic information carrier, said surface having a plurality of recesses formed therein, said support member further comprising a plurality of movable sliding sections, each sliding section being movably mounted in one of the recesses in said support member for movement between a rest position and a depressed position, each sliding section having its uppermost surface in coplanar relationship to said surface of the base plate when the sliding section is in the rest position, and in a lowered, non-coplanar relationship when the sliding section is in the depressed position;
   selectively altering the surface area of said support member by moving each of said sliding sections into either the rest position or the depressed position so that said thermoplastic information carrier is supported only by selected portions of said support member;
   pressing a foil-shaped embossing matrix onto the thermoplastic information carrier; said embossing matrix having a diffraction phase relief pattern on the surface which is pressed onto the thermoplastic information carrier;
   heating the embossing matrix by passing an electric current impulse through said matrix while it is pressed onto the thermoplastic information carrier; and
   maintaining the embossing matrix presssed onto the thermoplastic information carrier after the electric current impulse has ceased, until the selected embossed relief pattern formed on the thermoplastic information carrier has hardened.

5. A method according to claim 4, wherein said selected relief pattern is a phase hologram or a phase diffraction grating.

6. A method according to claim 4, wherein the thermoplastic information carrier has a coating of a thin metallic layer, and the selected relief pattern is embossed into the information carrier through said layer.

7. A method for embossing a high-resolution diffraction phase relief pattern into a thermoplastic information carrier, comprising:
   coating the thermoplastic information carrier with a thin metallic layer;
   placing the coated thermoplastic information carrier on a support member;
   pressing a foil-shaped embossing matrix onto the coated thermoplastic information carrier by means of a punch, said embossing matrix having a diffraction phase relief pattern on the surface which is pressed onto the coated thermoplastic information carrier;
   heating the embossing matrix by passing an electric current impulse through said matrix while it is pressed onto the coated thermoplastic information carrier; and
   maintaining the embossing matrix pressed onto the coated thermoplastic information carrier after the electric current has ceased, until the relief pattern embossed through said metallic layer in said thermoplastic information carrier has hardened.

8. A method according to claim 7, wherein the embossed relief pattern is a phase hologram or a phase diffraction grating.

9. A method according to claim 7, wherein the distance between the lines of the relief pattern is a few microns or less.

* * * * *